(12) United States Patent
Fort et al.

(10) Patent No.: US 7,983,117 B2
(45) Date of Patent: Jul. 19, 2011

(54) OPTICAL MEMORIES, METHOD FOR READING AND WRITING SUCH OPTICAL MEMORIES, AND DEVICE FOR READING AND WRITING SUCH MEMORIES

(75) Inventors: Alain Fort, Strasbourg (FR); Kokou Dorkenoo, Strasbourg (FR); Denis Gindre, Angers (FR); Alberto Barsella, Strasbourg (FR)

(73) Assignee: Centre National de la Recherche Scientifique-CNRS, Paris (FR)

( * ) Notice: Subject to any disclaimer, the term of this patent is extended or adjusted under 35 U.S.C. 154(b) by 257 days.

(21) Appl. No.: 12/226,980

(22) PCT Filed: May 4, 2007

(86) PCT No.: PCT/FR2007/051219
§ 371 (c)(1),
(2), (4) Date: Mar. 20, 2009

(87) PCT Pub. No.: WO2007/128938
PCT Pub. Date: Nov. 15, 2007

(65) Prior Publication Data
US 2011/0019511 A1    Jan. 27, 2011

(30) Foreign Application Priority Data

May 5, 2006  (FR) .................................... 06 51627

(51) Int. Cl.
*G11B 11/00* (2006.01)
(52) U.S. Cl. ..................................... 369/13.14; 369/284
(58) Field of Classification Search ............... 369/13.14, 369/283, 284, 13.02; 430/270.11; 428/64.8
See application file for complete search history.

(56) References Cited

U.S. PATENT DOCUMENTS

| 4,946,261 | A | 8/1990 | Yaegashi et al. |
| 7,459,263 | B2 * | 12/2008 | Farid et al. ............... 430/270.11 |
| 2005/0136357 | A1 | 6/2005 | Farid et al. |

FOREIGN PATENT DOCUMENTS

| EP | 0 295 145 A1 | 12/1988 |
| EP | 0 397 545 A1 | 11/1990 |

OTHER PUBLICATIONS

R. A. Hill, et al., "Reversible optical storage utilizing pulsed, photoinduced, electric-field-assisted reorientation of azobenzenes", Applied Physics Letters, AIP, American Institute of Physics, Melville, NY, US, vol. 66, No. 17, Apr. 24, 1995, pp. 2156-2158, XP012012608, ISSN: 0003-6951.

A. Petri, et al., "Photoinduced Reorientation of Cholesteric Liquid Crystalline Polysiloxanes and Applications in Optical Information Storage and Second Harmonic Generation," Ber. Bunsenges. Phys. Chem. vol. 97, No. 10, 1993, pp. 1281-1286, XP002412002.

* cited by examiner

*Primary Examiner* — Ali Neyzari
(74) *Attorney, Agent, or Firm* — Harness, Dickey & Pierce, P.L.C.

(57) ABSTRACT

The invention concerns a optical data memory, said memory comprising at least one layer of supporting material, said supporting material including molecules having, in a local zone, a collective state of molecules from at least one first collective state of molecules, and a second collective state of molecules. The invention is characterized in that only molecules having the first collective state of molecules in said local zone are capable of generating a second-harmonic signal when they are excited in said local zone by a reading electromagnetic radiation.

18 Claims, 14 Drawing Sheets

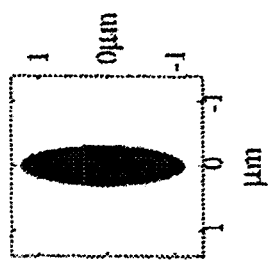
FIG. 4A
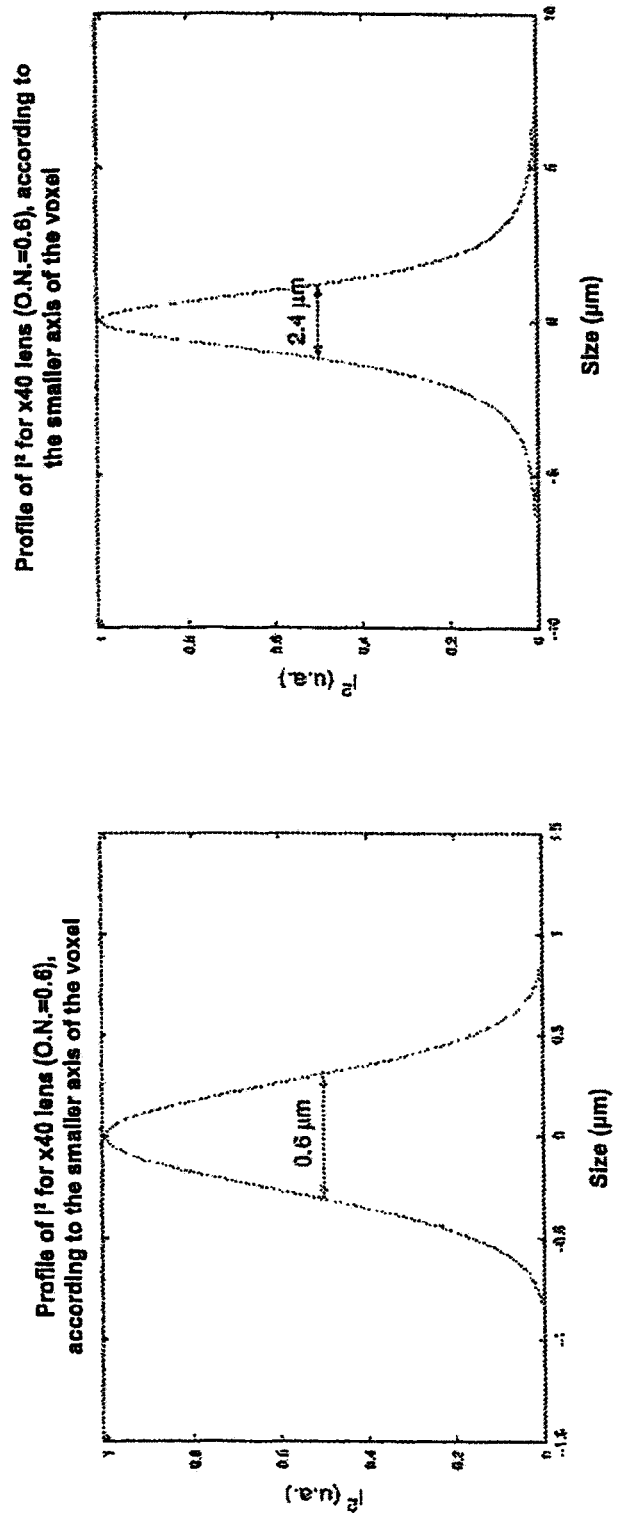
FIG. 4C
FIG. 4B

OPTICAL MEMORIES, METHOD FOR READING AND WRITING SUCH OPTICAL MEMORIES, AND DEVICE FOR READING AND WRITING SUCH MEMORIES

CROSS-REFERENCE TO RELATED APPLICATIONS

This application is a National Phase Entry of International Application No. PCT/FR2007/051219, filed May 4, 2007, claiming priority to French Patent Application No. 0651627, filed May 6, 2006, both of which are incorporated herein by reference.

BACKGROUND AND SUMMARY

The present invention relates to the technical field of optical memories. The present invention more particularly relates to an optical data memory, said memory comprising at least one layer of a supporting material, said supporting material comprising molecules having, in a local zone, a collective state of molecules among at least a first collective state of molecules and a second collective state of molecules.

Such memories are, for example, known from the application PCT WO 99/23650 where it discloses an optical disc comprising photochromes inserted into a matrix. The photochromes have two physico-chemical states. In a way known per se, the two physico-chemical states correspond to an open form of the molecule and to a closed form of the molecule. The modification of the physico-chemical state of the photochrome is carried out by a strongly focused laser radiation by a two photon absorption. With this radiation, the closed structure of the molecule is modified so as to produce locally open molecules. It is known per se that the two photon absorption effect is an extremely localised quadratic phenomenon as in function of the intensity, which makes it possible to modify the state of the molecule with a high resolution. The two photon absorption thus makes it possible to carry out some writing into the matrix forming the disc.

The above-mentioned document also teaches that both physico-chemical states of the photochromes have absorption strips which are far away in the visible spectrum, typically 450 nm for the first state, and 530 nm for the second state. Such difference in the absorption proprieties makes it possible to carry out the reading of the disc. For this purpose, an electromagnetic radiation is sent onto the disc and the absorbed spectrum and an emission of fluorescence are detected. The reading electromagnetic radiation is also focused in a very accurate way on the layer to be read and on the reading zone of the layer. This is for example carried out by means of a two photon fluorescence excitation of the photochrome molecules.

Then a first characteristic of the absorption corresponds to a "1" bit and a second characteristic corresponds to a "0" bit. The optical disc such as described in the above-mentioned document thus enables the storage of data. However, the optical disc disclosed in the above-mentioned document has the drawback that the two states of the photochromes have different stabilities. Then, it cannot be guaranteed that the photochromes of a given state have willingly been placed in this state or came back to this state because of the instability of the antagonist state. This creates errors in the writing of the disc and consequently mistakes when it is read. The spatial selectivity in a direction perpendicular to the surface of the disc is obtained by inserting inactive intermediate layers, 30 microns in thickness, which separate the active layers, 1 micron in thickness, thus limiting the density of the storage of information.

The invention aims at remedying the drawbacks of the prior art. More particularly, the invention aims at supplying an optical memory having a large capacity of storage of information, typically more than one terabit of information per $cm^3$. Another aim of the invention is to be able to write in and read from an optical memory with a large spatial selectivity.

Another aim of the invention is to provide a method for writing in and reading from an optical memory wherein the spatial selectivity upon writing is substantially equal to the spatial selectivity upon reading. Another aim of the invention is to provide a stable optical memory, the stored information of which is persistent, more particularly not to cause any error when reading the information. Another aim of the invention is to provide an optical memory which can have multiple layers whereon the information is stored while being able to selectively read one or the other of the information layers. At least one of these aims is reached by the invention, one aim of which is to provide an optical data memory, said memory comprising at least one layer of a supporting material, said supporting material comprising molecules having in a local zone a collective state of molecules among at least a first collective state of molecules and a second collective state of molecules, wherein the molecules of two different collective states of molecules being capable of generating, when they are excited by a reading electromagnetic radiation, second harmonic signals having different intensities.

The memory according to the invention thus makes it possible to differentiate the local collective states of molecules representing "0" bits or "1" bits by detecting a second harmonic signal with respect to the wavelength of the reading electromagnetic radiation. This second harmonic signal and the intensity thereof will be detected upon the step of reading, by excitation in a local reading zone. In a way known per se, the second harmonic generation phenomenon is a quadratic effect as a function of the electromagnetic radiation intensity. Thanks to this quadratic effect, the generation of the second harmonic can be detected with a very good spatial resolution, since the effect of the molecules positioned outside the focusing zone will be negligible with respect to the effects of the molecules within the focusing zone.

The memory according to the invention thus enables the selective reading of the data stored. Eventually, only the molecules having said first collective state of molecules in said local zone are capable of generating a second harmonic signal when they are excited in said local zone by a reading electromagnetic radiation. An increased discrimination between the first state and another state is then possible.

According to an embodiment of the invention, said molecules can be orientable charge-coupled molecules and said first collective state of molecules may then be a privileged collective orientation of said molecules in said local zone of said supporting material, and said second state of molecules can be a random orientation of said molecules in said local zone of said supporting material. For the purpose of this application, the privileged collective orientation of the molecules is an orientation according to a privileged direction for example induced by an orientation electric field in the direction of this orientation electric field. This privileged collective orientation is opposed to a random orientation of the molecules. As will be described in greater details in the following, collectively oriented molecules according to a privileged orientation are more particularly capable of generating a second harmonic signal.

The molecules used according to the invention can then be charge-coupled molecules, as for example charge-coupled chromophores. The digital information using "1" or "0" bits is represented by collective orientation properties of the charge-coupled chromophores. As a matter of fact, the charge-coupled molecules can be collectively oriented in a privileged direction under the effect more particularly of an electric field in a reading local zone and disoriented, for example under the effect of an electromagnetic radiation. Then, in a local zone, the molecules according to the invention are either all oriented according to a privileged orientation or randomly oriented. The localised application of a writing electromagnetic field in the local area makes it possible to disorient the molecules and thus to write a bit "0" at the desired locations. Writing in the memory is thus made possible through the utilisation of charge-coupled molecules and through the selection of the orientation thereof.

In addition, a privileged collective orientation of the molecules in a reading local zone makes it possible to generate the second harmonic radiation when they are excited by a reading electromagnetic radiation in this local zone. On the contrary, a random orientation of the molecules does not generate this second harmonic radiation. And reading the memory is possible according to the invention through the detection of a second harmonic signal after the excitation by a reading radiation in a reading local zone.

According to one embodiment of the invention, said charge-coupled molecules can be chromophores of the azobenzene series, so that the charged couple molecules can be easily oriented or disoriented.

According to an exemplary embodiment of the invention, said molecules may include an acrylate group, in order to improve the stability of the molecules having a privileged orientation in the supporting material. In order to enable a correct stability of the molecules in their state of molecules, more particularly when the molecules have a privileged orientation, said supporting material may be a polymer. In order to further increase the stability over time of the orientation of the molecules in their privileged state of direction, said supporting material may be an organic/inorganic hybrid material.

The invention also relates to a method for reading from an optical data memory comprising at least one layer supporting material, said supporting material comprising molecules, with a part of said molecules being capable of emitting a second harmonic signal through an excitation by an electromagnetic radiation, said method comprising the following steps:
focusing the reading electromagnetic radiation on a reading zone of a layer of said optical memory;
detecting the intensity of a second harmonic signal emitted by molecules in said reading zone;
generating a reading signal representing said detected intensity.

In a way known per se, the phenomenon of the second harmonic generation is a quadratic effect in function of the intensity of the electromagnetic radiation. Thanks to the quadratic effect, the generation of the second harmonic with a very good spatial resolution can be detected since the effect of the molecules positioned out of the focusing zone will be negligible with respect to the effect of the molecules within the focusing zone. The second harmonic signal is thus a radiation having a wavelength different from the wavelength of the reading incident radiation. The detection of the wavelength and the intensity thereof makes it possible to determine whether the molecule is in a state generating a second harmonic signal having an intensity corresponding to a predefined binary symbol. More particularly, it can be predicted that a simple positive or negative detection of the signal is carried out, thus making it possible to determine whether the molecule is in a state generating a second harmonic signal corresponding for example to a bit "1" or a state generating no second harmonic signal corresponding for example to a bit "0".

Thus, in the reading method mentioned hereabove, said step of generating a reading signal representing said detection includes sub-steps consisting in:
generating a first value of said reading signal in case of a positive detection of said second harmonic signal;
generating a second value of said reading signal in case of a negative detection of said second harmonic signal.

The invention also relates to a writing method in a data memory comprising at least a layer of a supporting material, said supporting material comprising molecules capable of taking a collective state of molecules among at least a first collective state of molecules and a second collective state of molecules, said method comprising the following successive steps:
applying an orientation electric field to said at least one layer, with said orientation electric field being capable of putting said molecules in said first collective state of molecules;
fixing said molecules in said collective state of molecules;
selectively applying a writing electromagnetic radiation to at least one writing zone of the at least one layer, with said writing electromagnetic radiation being capable of switching said molecules from said first collective state of molecules to said second collective state of molecules in said at least one writing zone, and wherein the molecules of two different collective states of molecules being capable of generating, when they are excited by a reading electromagnetic radiation, second harmonic signals having different intensities.

Eventually, only the molecules having said first collective state of molecules are capable of generating a second harmonic signal when they are excited by a reading electromagnetic radiation in said writing area.

According to the writing method of the invention, the assembly of molecules is put in the first state of molecules for example the state corresponding to a bit "1" or a binary symbol composed of several "1"s through the application of an orientation electric field. The state of the molecules is then stabilised by fixing the molecules in this state. The bits "0" or other binary symbols are then selectively written through the application of the writing electromagnetic radiation. The power and/or the time of exposure of the electromagnetic radiation may be modulated when more than two states are necessary to encode the binary symbols. These different bits may then be read using the reading method such as described previously since the molecules having said first state of the molecules only are capable of generating a second harmonic signal.

As previously mentioned, said molecules may be orientable charge-coupled molecules and said first collective state of molecules can be a privileged collective orientation of the molecules in said supporting material, and said second state of molecules can be a random collective orientation of said molecules, wherein said orientation electric field is thus capable of orienting said molecules according to said privileged collective orientation. In this case, said orientation electric field is capable of orienting said molecules according to said privileged collective orientation. In order to allow a correct spatial selectivity of the writing zones, said writing electromagnetic radiation is capable of generating a two photon absorption in at least one writing zone, said two photon absorption being capable of switching said molecules from said first state to said second state in said at least one writing zone.

In a way known per se, the effect of the two photon absorption makes it possible to obtain a very good spatial selectivity of the absorption, more particularly because this effect is a quadratic effect as a function of the intensity of the writing electromagnetic radiation. In addition, as this effect is quadratic as the second harmonic generation effect, the writing spatial resolution is of the order of the reading spatial resolution. This makes it possible to obtain a memory from which data can be read efficiently and consistently with the information written.

According to one embodiment, in order to stabilise the molecules in the first collective state of molecules, said step of fixing said molecules in said first collective state of molecules may include a step of polymerisation of said supporting material. Thus, the material becomes rigid and the molecules integrated in the material are fixed in their first state of molecules. This gives a stability to this state which makes it possible to obtain a certain consistence when writing the data.

In order to write in the optical memory predetermined data in the above-mentioned reading method, said step of the selective application of a writing electromagnetic radiation may include sub-steps consisting in:
receiving a writing binary signal;
applying said writing electromagnetic radiation to at least one writing zone as a function of said writing binary signal.
Thus, the privileged orientation and random orientation zones correspond to the binary data to be written.

More particularly the above-mentioned method may include steps consisting in:
receiving a binary writing signal having a first writing signal value or a second writing signal value;
applying said writing electromagnetic radiation only when said writing signal has said first writing signal value.

In addition, it is possible to re-write data when they have been erased. In this case, the above-mentioned writing method may include a previous step consisting in:
heating said memory so as to put said molecules in said second state of molecules.

In this case, the molecules which are back in their random orientation state because of the heating step can be globally reoriented and then selectively disoriented as previously.

The invention also relates to a device for reading an optical data memory comprising at least a layer of a supporting material, said supporting material comprising molecules, a part of said molecules being capable of emitting a second harmonic signal through an excitation by an electromagnetic radiation, with said device comprising:
focusing means capable of focusing a reading electromagnetic radiation on a reading area of a layer of said optical memory;
detection means capable of detecting the intensity of a second harmonic signal emitted by molecules in said reading zone;
generation means capable of generating a reading signal representing said detected intensity.

It also relates to a device for writing into a data memory from at least one layer of a supporting material, said supporting material comprising molecules capable of taking a collective state of molecules among at least a first collective state of molecules and a second collective state of molecules, with said device being characterised in that it includes:
orientation means capable of applying an orientation electric field to said at least one layer so as put said molecules in said first collective state of molecules;
fixing means capable of fixing said molecules in said first collective state of molecules;
writing means capable of selectively applying a writing electromagnetic radiation to at least a writing zone of said at least one zone so as to switch said molecules from said first collective state of the molecules to said second collective state of molecules in said one writing zone;
the molecules of two different collective state of molecules being capable of generating, when they are excited by a reading electromagnetic radiation, second harmonic signals having different intensities.

Eventually, only molecules having said first collective state of molecules are capable of generating a second harmonic signal when they are excited by an electromagnetic reading radiation in said writing zone.

In one embodiment of the above-mentioned writing device, said molecules can be orientable charge-coupled molecules and said first collective state of molecules can be a privileged collective orientation of said molecules in said supporting material, and said second collective state of the molecules can be a random collective orientation of said molecules in said writing zone and said orientation electric field can be capable of orienting said molecules according to said privileged collective orientation. In one embodiment of the above-mentioned reading device, said writing electromagnetic radiation can be capable of generating a two photon absorption at said at least one writing zone, said two photon absorption being capable of switching said molecules from said first collective state of molecules to said second collective state of molecules in said at least one writing zone. According to one embodiment of the reading device, said fixing means may include polymerisation means capable of polymerizing said supporting material.

BRIEF DESCRIPTION OF DRAWINGS

Now, a particular embodiment of the invention will be described while referring to the appended figures, wherein:
FIGS. 4A, 4B and 4C show the shape of the elementary volumes of the zones or voxels, according to the invention for a second digital opening of 0.6 of a writing laser beam.

DETAILED DESCRIPTION

In the above-mentioned figures, identical references refer to similar technical elements. In particular, the molecules used in the scope of the present invention are generally referred to by reference 1. They will be indicated by reference 2 when they have a random local orientation and by reference 4 when they have a privileged collective local orientation.

Figure 1:
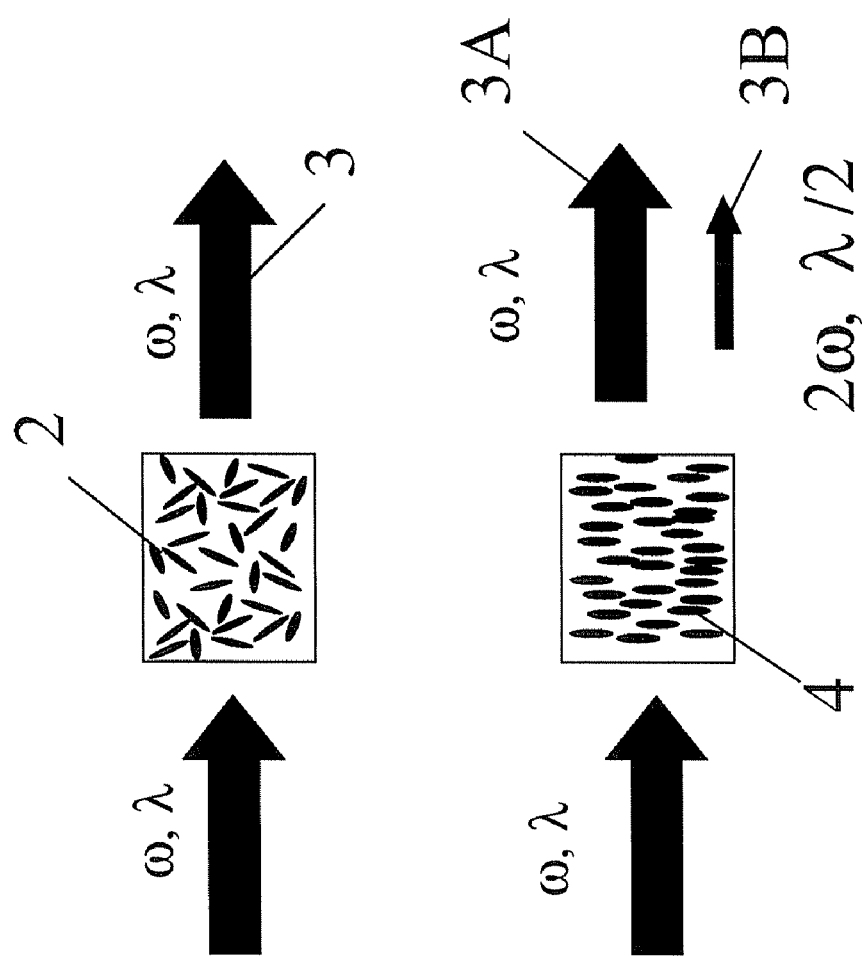
FIG. 1 is an illustration of the phenomenon of the second harmonic generation due to the orientation of the molecules gone through by a light beam.

FIG. 1 illustrates the phenomenon of generating a second harmonic due to the collective orientation of molecules in a volume. As illustrated in the upper part of FIG. 1, the beam transmitted by this volume does not modify the wavelength of the incident beam when randomly oriented molecules 2 in a volume receive a light beam having a wavelength $\lambda$. The transmitted beam 3 thus also has a wavelength $\lambda$.

As illustrated in the lower part of FIG. 1, a first beam 3A having a wavelength $\lambda$ is transmitted, as well as a second beam 3B having half the wavelength $\lambda/2$, when molecules having a privileged collective orientation according to a privileged direction 4 receive a light beam having a wavelength $\lambda$. The appearance of this beam having half the wavelength is characteristic of the generation of a second harmonic by the molecules collectively oriented in a privileged way. In a way known per se, randomly oriented molecules 2 in a local volume do not allow the generation of the second harmonic.

Figure 2:
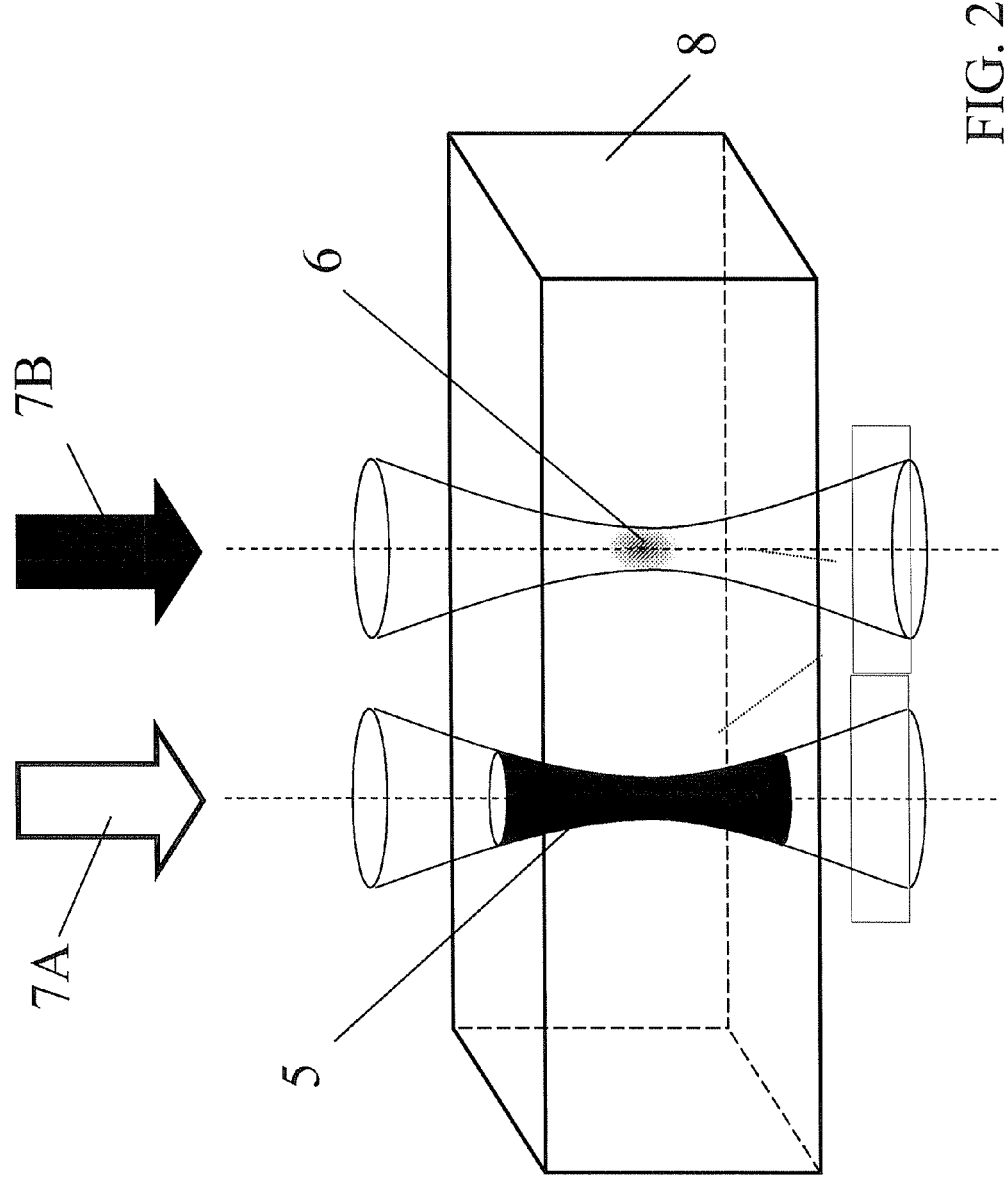
FIG. 2 is an illustration of the spatial selectivity of the two photon absorption phenomenon in a material.

FIG. 2 now illustrates the phenomenon of the two photon absorption, within the scope of the present invention. When a medium 8 is excited with a laser beam 7A corresponding to the wavelength of absorption of the molecules of the medium 8, the excitation by a one photon absorption is localised on a wide zone 5, since in this case the one photon absorption is a linear phenomenon. On the contrary, when exciting the medium 8 with a laser beam 7B having a wavelength adapted to the two photon absorption, the one photon excitation is localised on a smaller zone 6 since the two photon absorption phenomenon is a quadratic phenomenon. Thus, it is possible to obtain a very good location of the excitation zone of a medium, by a two photon absorption of the medium molecules.

Figure 3C:
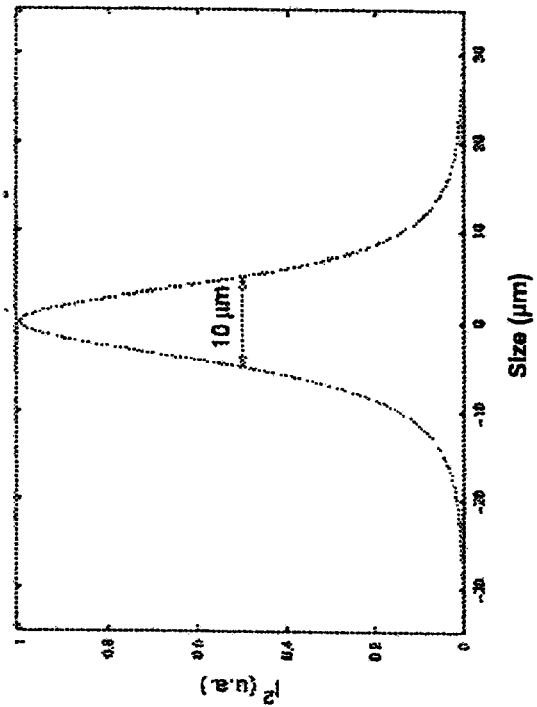
FIGS. 3A, 3B and 3C show the shape of the elementary volumes of the zones or voxels, according to the invention for a first digital opening of 0.3 of a writing laser beam.
Figure 3A:
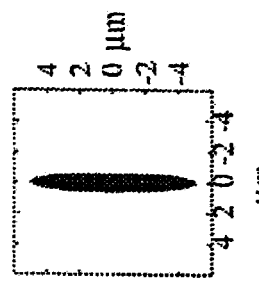
Figure 3B:
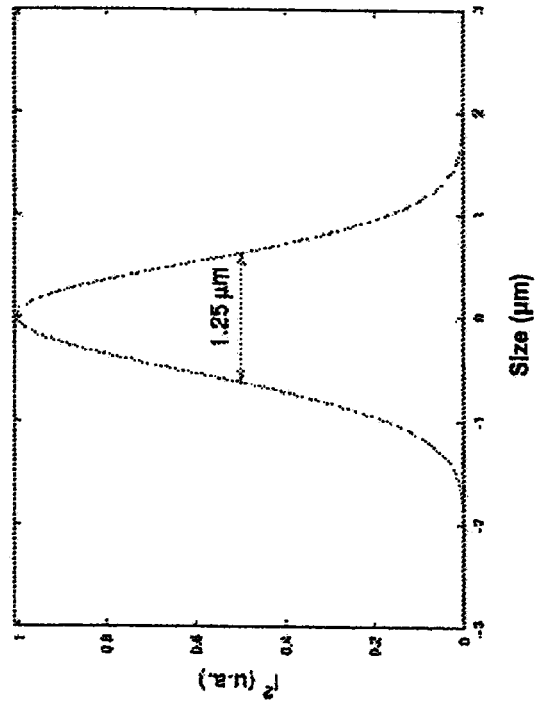

FIGS. 3A, 3B and 3C illustrate a two photon absorption of fluorescent molecules excited by a laser, the dimensions of the fluorescence emitting zone in the form of a voxel for lens with a digital opening up to 0.3. According to FIG. 3A, an oblong shape of the voxel corresponding to the emitting zone can be observed. In FIG. 3B, it can be seen that the profile of the emission intensity has a characteristic length of 1.25 micrometres according to the smaller axis of the voxel in a plane perpendicular to the exciting beam. In FIG. 3C, it can be seen that the profile of the emission intensity has a characteristic length of approximately 10 micrometres according to the bigger axis of the voxel in the direction of the excitation beam.

FIGS. 4A, 4B and 4C illustrate the same data for lens with a digital opening of 0.6. Now, in FIG. 4B, it can be seen that the profile of the emission intensity has a characteristic length of 0.6 micrometres according to the smaller axis of the voxel in a plane perpendicular to the exciting beam. In FIG. 4C, it can be seen that the profile of the emission intensity has a characteristic length of 2.4 micrometres according to the bigger axis of the voxel in the direction of the excitation beam. This property of the two photon absorption is known per se and is described in greater details in the work by Y. R. Shen "The principles of Nonlinear Optics", Wiley, New-York 1984. The present invention advantageously implements the fact that both physical phenomena of the two photon absorption and the second harmonic generation are quadratic phenomena, which enables a good spatial resolution of these phenomena.

Figure 5:
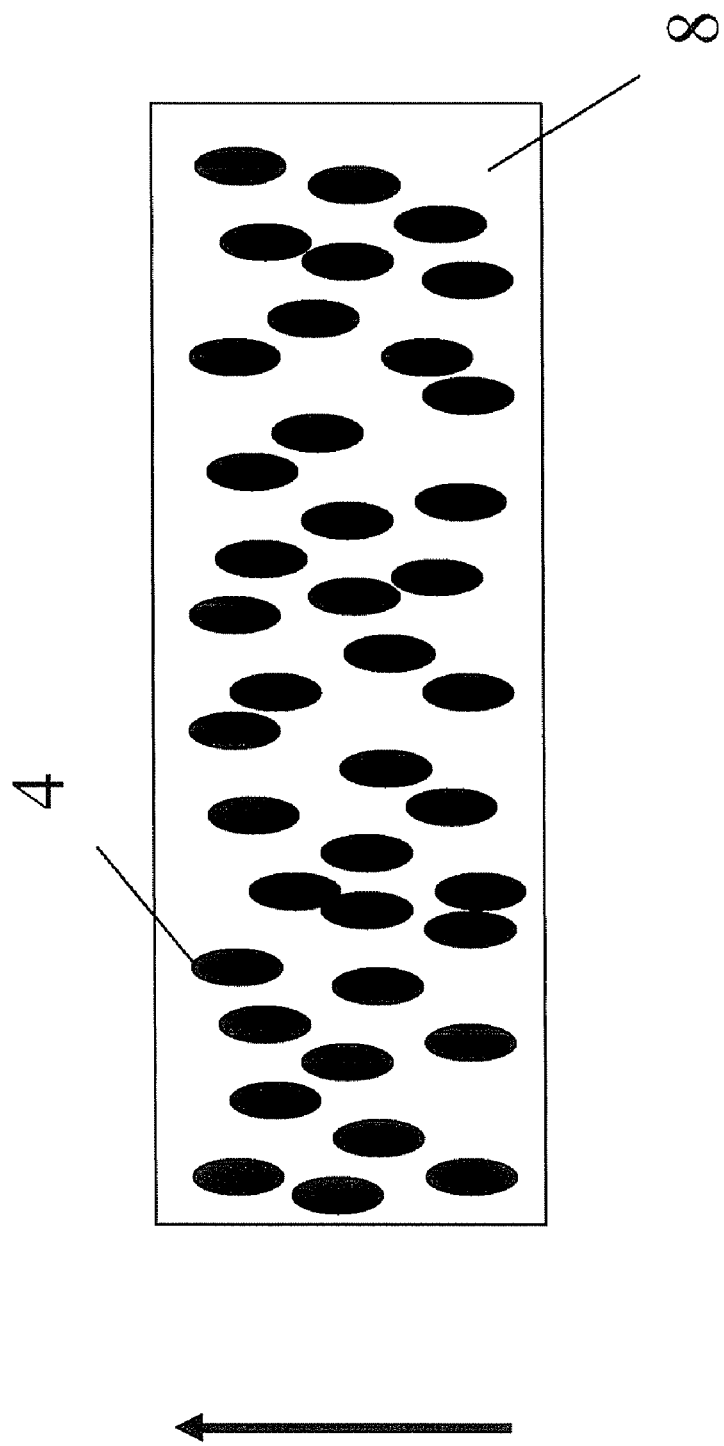
FIG. 5 shows a step of a writing method according to the invention wherein the molecules are oriented according to the privileged orientation in a memory according to the invention.

FIG. 5 illustrates a method of collective orientation in a privileged direction of molecules 4 within the scope of the present invention. According to the invention, the molecules 4 are collectively oriented according to a privileged direction in a matrix 8. The matrix 8 is a polymeric matrix or an organic/inorganic hybrid material, for example of a sol-gel type. The matrix 8 can be cross-linked or polymerised and functionalised by charge-coupled molecules, also called push-pulled molecules, which haves a permanent dipolar moment and a strong quadratic hyper-polarisability. The charge-coupled molecules are for example charge-coupled chromophores of the D-π-A type. Such charge-coupled chromophores have a strong dipolar permanent moment and can thus be oriented in an electric field. Such molecules can also be functionalised with acrylate groups making it possible to graft the charge-coupled chromophore to the polymer matrix and thus guarantee a better stability of the orientation which is fixed by photocross-linking or photopolymerisation. The polymer used is preferably a polymer having a high glass transition temperature $T_g$, i.e. a temperature above the room temperature.

Under the effect of an electric field $E_0$ which has an orientation direction, the molecules 4 are oriented in a privileged direction in the matrix 8. The electric field $E_0$ is applied using electrodes or by a Corona effect and has an intensity of a few kilovolts per millimetre.

According to an alternative solution, the orientation of the charge-coupled molecules can also be carried out using an optical method. Once the molecules 4 are oriented in a privileged direction, the matrix 8 is made rigid either using a thermal method or an optical method for example photopolymerisation. This rigidification of the material results in a permanent fixation of the charged couple molecules 4 orientation in a privileged direction in the material 8.

Once rigidified, the material 8 may have a high concentration in charge-coupled chromophore, typically 40% by doping, grafting or incorporation in the monomer links. The electro-optical coefficient of the material thus concentrated in chromophores is non negligible, typically at 100 pm/V. According to the invention, at this stage of the writing method, all the molecules of the material 8 are oriented according to this privileged orientation. If the optical memory includes a plurality of layers, the molecules of all the layers are oriented according to this privileged orientation.

Figure 6:
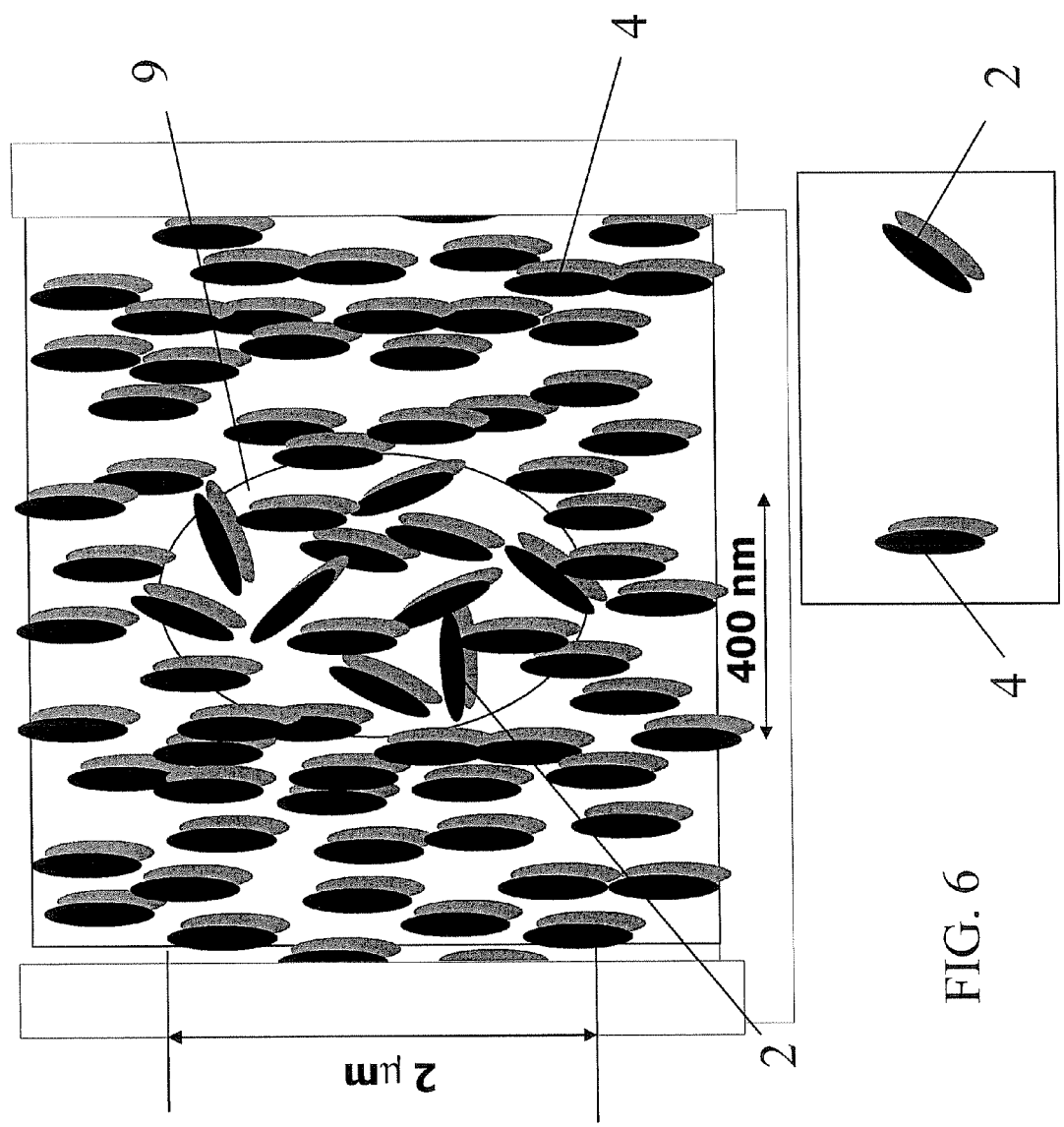
FIG. 6 shows the disorientation of the molecules obtained by a step of writing according to the invention.

FIG. 6 shows a modified local state 9 of the molecules according to a writing method of the invention. According to the invention, bits "0" are written in a material 8 such as previously described, wherein the molecules will be oriented according to a privileged direction and represent bits "1". This inscription is carried out using a laser beam focused in a micro-volume 9. The laser used is for example a femtosecond pulsed laser capable of generating a two photon absorption in microscopic volumes.

The laser beam is focused in the micro-volume 9 so as to generate a two photon absorption as previously described. Thus, the micro-volume 9 is strongly focused and may have dimensions as described while referring to FIG. 3A to 3C or 4A to 4C, typically less than one cubic micron. Under the effect of the focused laser beam and of a two photon absorption, oriented molecules 4 are disoriented into random orientation molecules 2 in the micro-volume 9.

Figure 8:
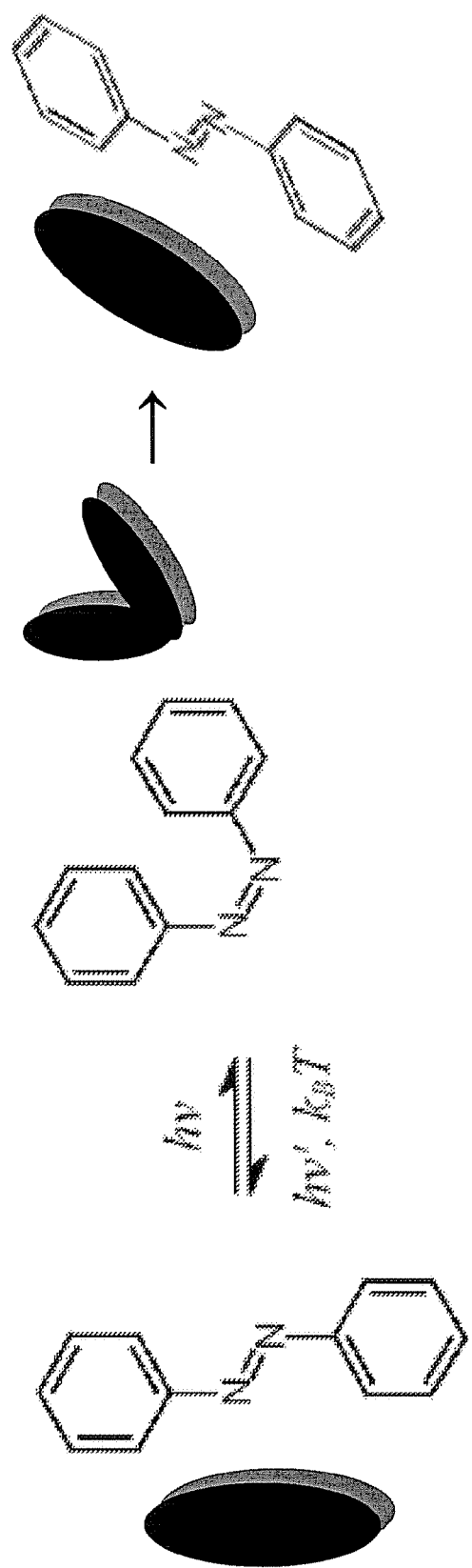
FIG. 8 shows the illustration of the disorientation effect used for writing in a memory according in the invention.

The disorientation effect of oriented molecules 4 into random orientation molecules in the micro-volume 9 is for example a consequence of a cis-trans effect illustrated in FIG. 8 for photochromes of the azobenzene type. This disorientation can be carried out by a photothermal effect. This cis-trans isomerisation effect for molecules of the azobenzene type is described in greater details in the work by H. Rau "Photochemistry and Photophysics", Vol. 2, J. Rebek, CRC Press, Boca Raton, Fla. 1990.

Figure 7:
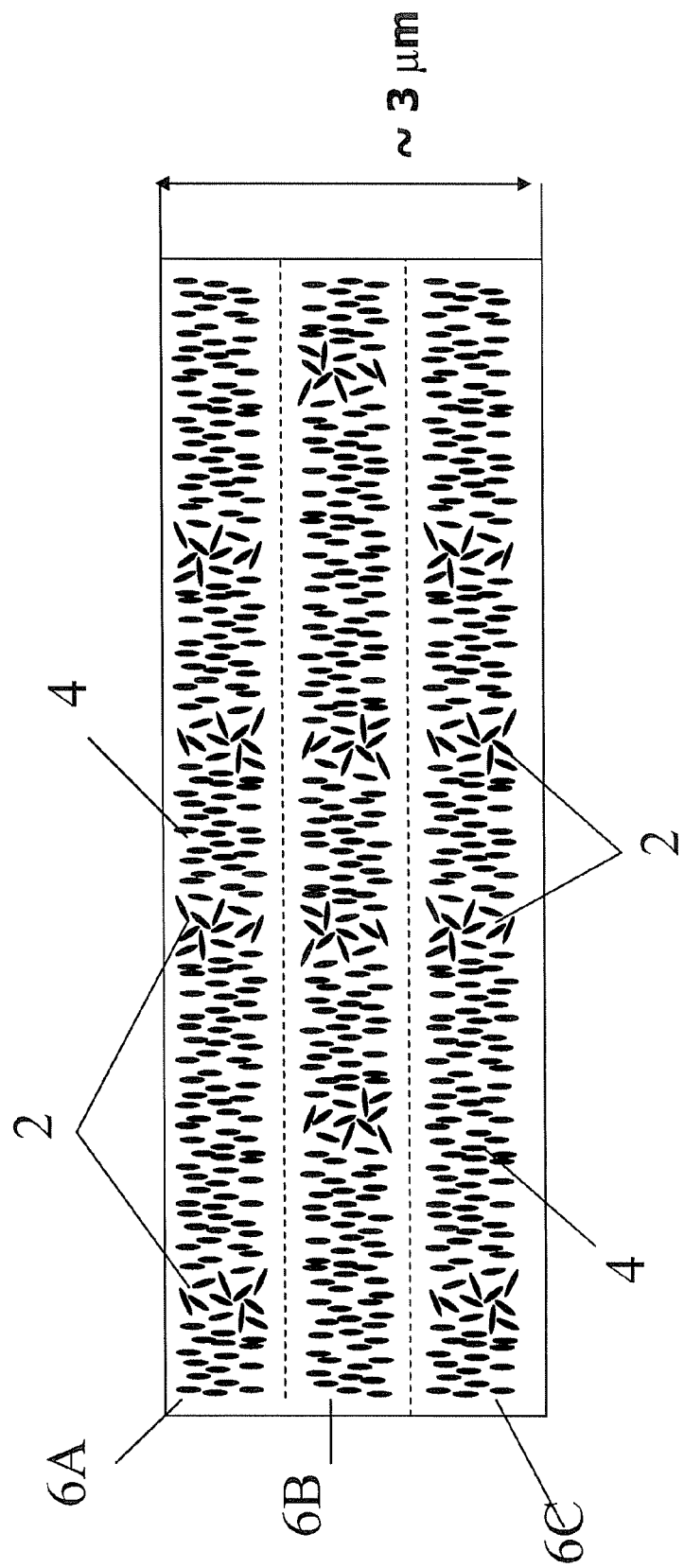
FIG. 7 shows three layers of a memory comprising globally oriented molecules and locally disoriented molecules according to the invention.

Now illustrated in FIG. 7, three layers 6A, 6B, 6C of a material 8 are represented, which include zones wherein molecules 4 have a privileged collective orientation and zones where molecules 2 have a random collective orientation. This memory configuration including three layers is obtained as previously described by a collective orientation in a privileged direction of all the molecules of the three layers 6A, 6B, 6C, and then through the selective disorientation in microvolumes through a two photon absorption. The layers 6A, 6B, 6C thus include various local zones, the first part of these zones including molecules in a first collective state of molecules corresponding to a privileged local orientation in the local zones and a second part of these zones including molecules in a second collective state of molecules corresponding to a random local orientation in the local zones. The planes 6A, 6B and 6C are typically separated by a few micrometres.

Figure 9:
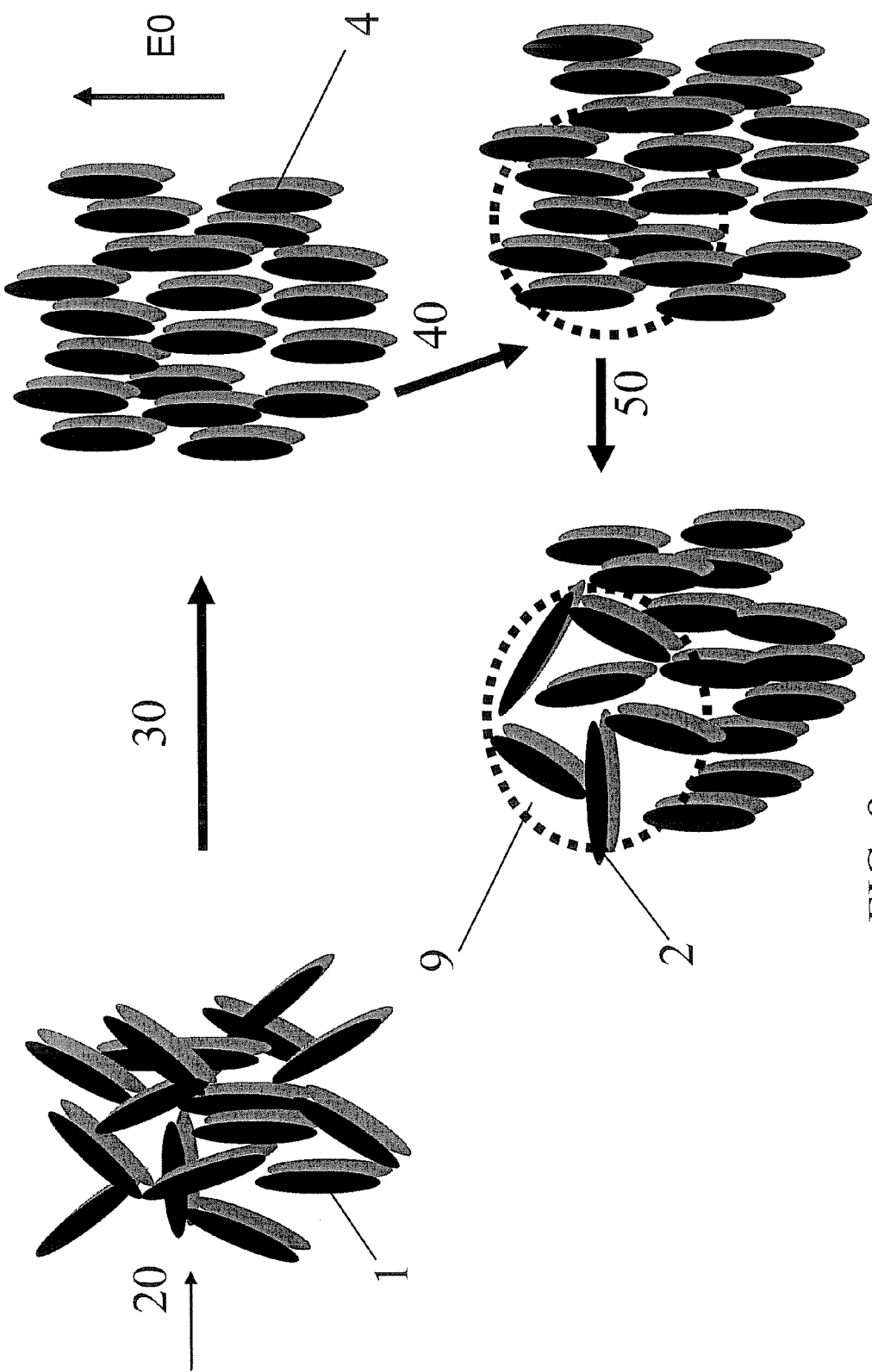
FIG. 9 shows all the steps of writing through the orientation and disorientation of the molecules according to the invention.

FIG. 9 illustrates the effect on charge-coupled molecules of the method of writing binary information according to the invention. In a step 20, molecules 1 are provided, preferably charge-coupled molecules, in a material, for example a cross-linkable or polymerisable material. In a step 30, such molecules are oriented in the material for example under the effect of an electric field $E_0$. The so oriented molecules are indicated by reference 4. The molecules are then fixed in this state for example by a rigidification of the material. During a step 40, a writing beam is focused in a writing zone 9 under the effect of a two photon absorption. During a step 50, the molecules are disoriented in the writing zone 9 in order to create a zone wherein the molecules 2 have a random orientation.

It should be noted that the means for checking the positions of the light beams as a function of the bits "0" or "1" to be written are known by the person skilled in the art. In this case the writing of a bit "0" requires the local application of the beam and the writing of the bit "1" does not require the emission of the beam. The 0 and 1 ciphering thus substantially corresponds to a succession of emission and non emission of the writing layer beam. During a step of reading, the reading beam will be transmitted together with the generation of the second harmonic for molecules 4 in a reading area having a privileged orientation and without the generation of a second harmonic for molecules 2 in a reading zone having a random orientation.

Figure 10:
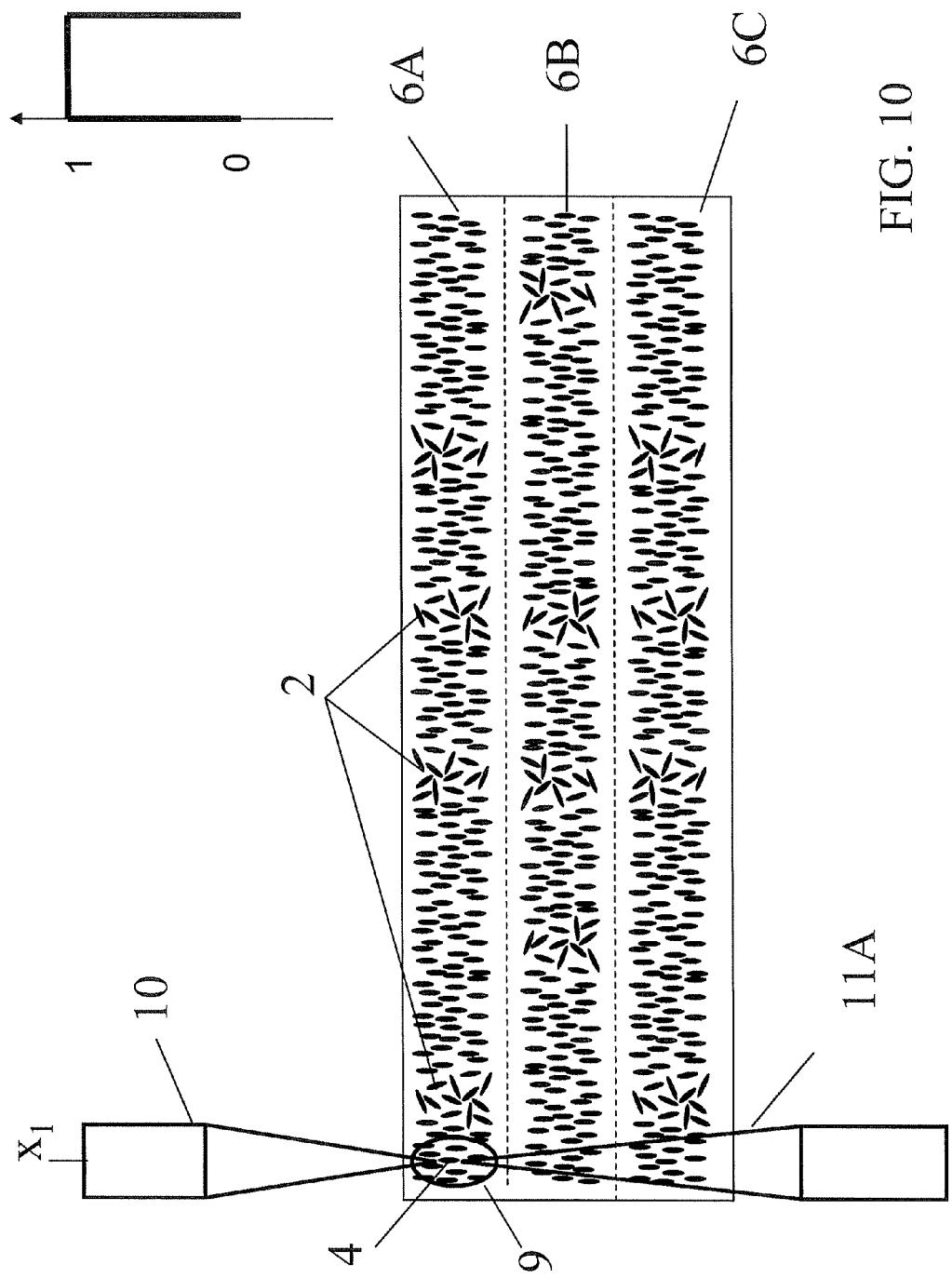
FIG. 10 to 13 show the steps of reading of a three layer memory according to the invention, as well as the binary representation obtained.

FIG. 10 to FIG. 14 illustrate a method for reading the information written on the disc as per the writing process such as previously described. On FIG. 10 is represented a memory according to the invention comprising zones wherein molecules 4 have a privileged orientation and zones wherein molecules 2 have a random orientation. These molecules are for example oriented in a general way and disoriented collectively as previously described.

These zones are successively read by an incident laser beam 10 having a wavelength λ and positioned at a position $x_1$. Then the beam transmitted by the passage of the incident beam at the reading zone 9 is detected. It also should be noted that the wavelength λ of the reading beam may be equal to the wavelength used for disorienting the molecules by a two photon absorption, but it can also be different. This wavelength λ is typically of the order of 800 nm. In addition, the reading laser is not necessary a pulsed laser.

According to the invention, the second harmonic signals which may have been generated by molecules 4 and 2 are detected. As previously described, the fact that phenomena of a second harmonic generation and two photon absorption are both quadratic effects enables the writing zone corresponding to disorientations of molecules to have a size of the order of the reading zone. This reduced size of the reading and writing zones is also true in a plane normal to the incident beam 10, as in the direction of the incident beam 10 which enables a reading and a writing on several layers 6A, 6B, 6C. The reading pitch and the writing pitch are thus of a similar order of magnitude, which makes it possible to supply a legible and rewritable memory.

In FIG. 10, the molecules 4 in the reading zone 9 corresponding to the focusing zone of the reading beam 10 are oriented in a privileged way according to one direction. A second harmonic signal is thus generated by the molecules 4 in the zone 9. A transmitted beam 11A having a wavelength λ/2 is thus detected. The detection of such a signal thus corresponds for example to the encoding of a bit "1". This is illustrated for example by a slot equal to 1 in FIG. 10. It should be understood that the means for detecting a second harmonic signal are known to the person skilled in the art. Similarly, electronic means intended for converting the detection or non detection of a second harmonic signal in binary information are also known to the person skilled in the art.

Figure 11:
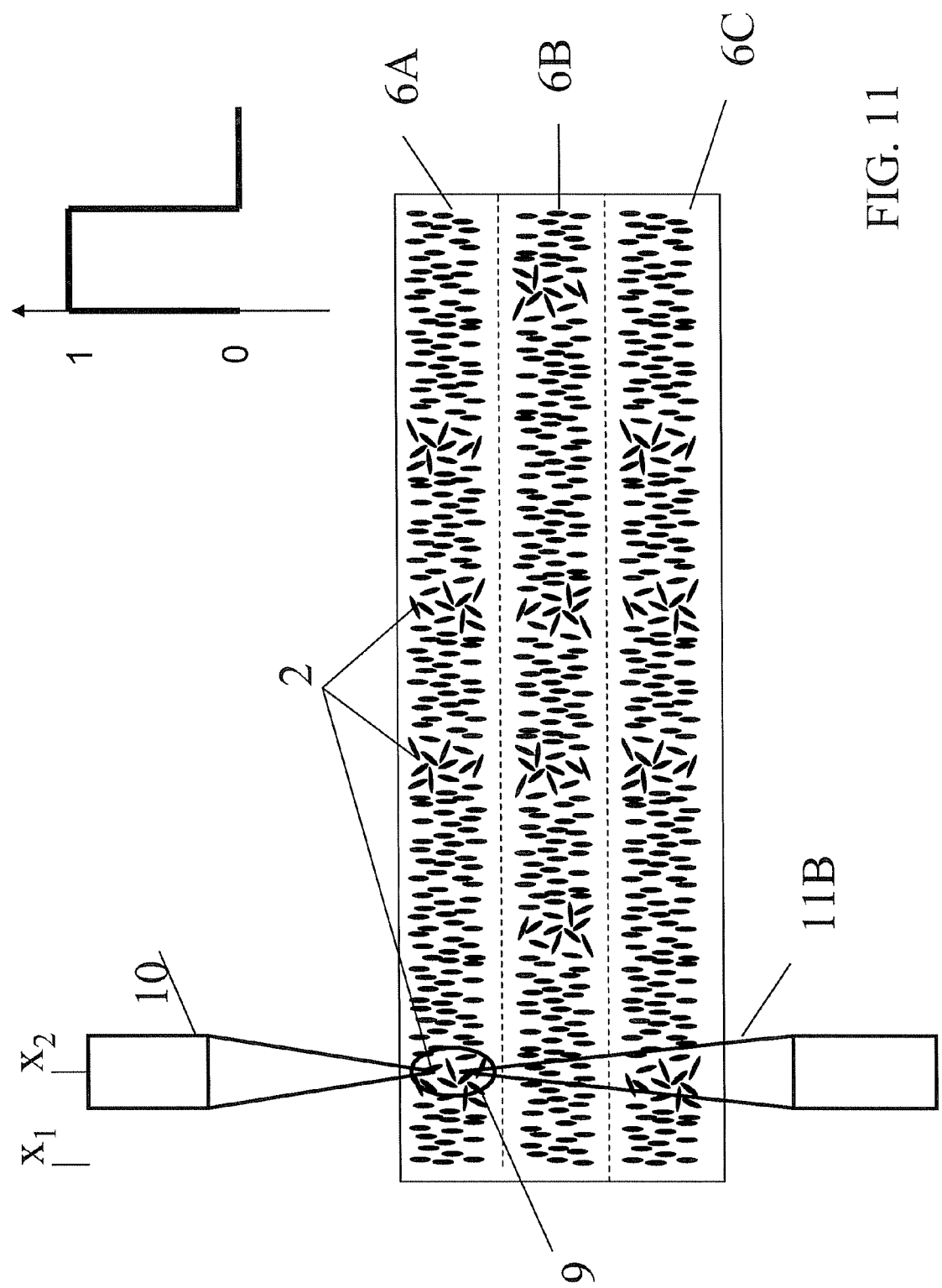

FIG. 11 illustrates the progress of the beam 10 so that it can successively read all the data in the layer 6A, 6B, 6C. Between FIG. 10 and FIG. 11, the laser has just been moved from position $x_1$ to position $x_2$. The reading laser may for example be moved in a reading direction by known mechanical means. The optical memory including layers 6A, 6B 6C may also be moved with respect to a fixed laser by known mechanical means.

In FIG. 11, the molecules 2 in the new reading zone 9 corresponding to the focusing zone of the reading beam 10 are randomly oriented in the new zone 9. No second harmonic signal is thus generated by the molecules 2 of this zone 9. The transmitted beam 11B comprises no component having a wavelength of λ/2 which corresponds for example to a bit "0" as illustrated by the slot in FIG. 11, for the value 0.

Figure 12:
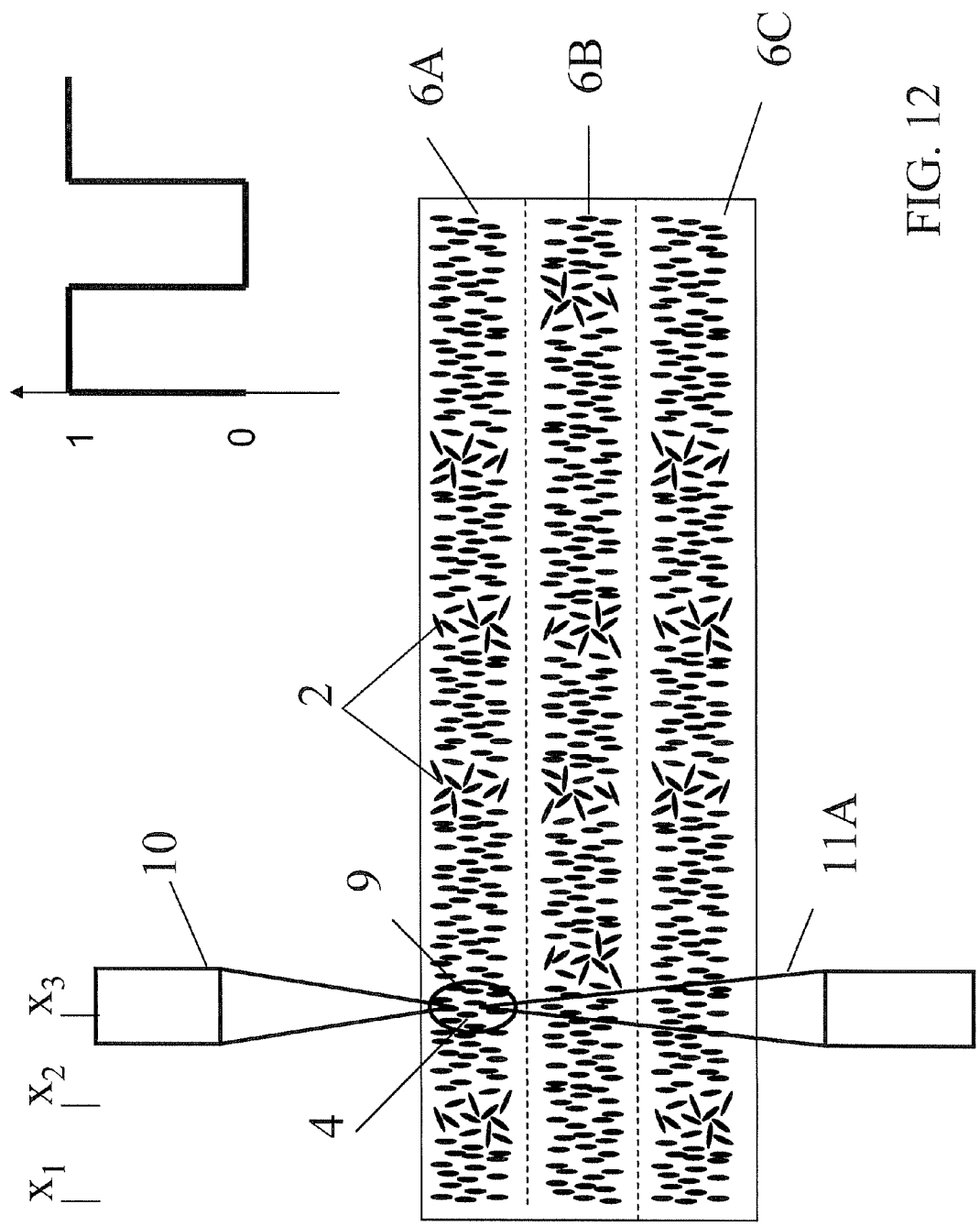

In FIG. 12, the reading light beam 10 is shifted in the memory to a new reading zone 9 corresponding to a position $x_3$ of the reading laser. This time, the molecules 4 have a privileged orientation in the reading zone. A second harmonic signal is thus generated by the molecules 4 of this zone 9. A transmitted beam 11A having a wavelength λ/2 is thus detected which correspond for example to a bit "1" as illustrated by the slot in FIG. 12, for the value 0. All the layers 6A, 6B and 6C of the memory according to the invention can thus be read as previously disclosed.

Figure 13:
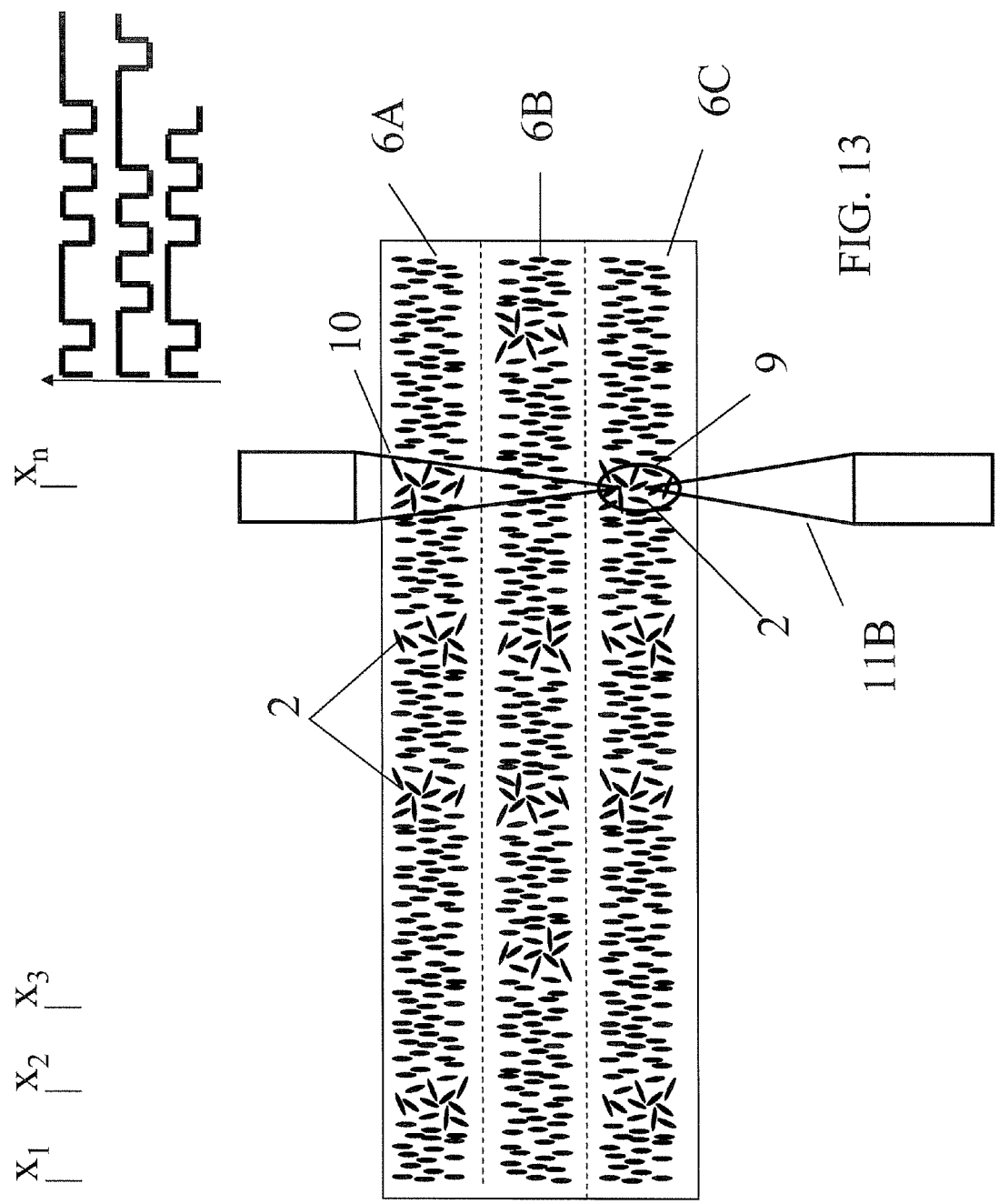

More particularly as illustrated in FIG. 13, the laser beam may be focused on any one of the layers of the material including the molecules. The laser is positioned according to a position $x_0$ on one axis and an altitude $z_0$. In FIG. 13, the beam is focused on the layer 6C towards a reading zone 9, wherein the molecules 2 is a random orientation. As previously mentioned, no second harmonic signal is detected in the transmitted beam 11B and a bit "0" is thus read as illustrated by the slot, for the value 0 corresponding to the third layer.

The optical memory such as previously described, can be organised in a disc comprising one or several layers. Then the various layers are written on as previously described. The number of the layers in the disc is limited according to the invention only because it is necessary to keep the writing beam close to the writing zone. In particular, for a focal distance of the writing reading of the order of 500 micrometres, it is possible to supply a memory having about one hundred layers having a few micrometres in thickness. The optical memory thus obtained enables inscription in a volume of bits having micrometric dimension.

It should be noted that the previously described optical memory can also be rewritable. As a matter of fact, when heating the memory to a sufficiently high temperature, the molecules oriented in the privileged way return to a random orientation. The application of the writing method according to the invention including successive steps of global orientation of the molecules according to a privileged direction and the local disorientation as a function of the data to be written thus makes it possible to rewrite in a memory according to the invention.

It should also be noted that the orientation disorder inside the molecules of a zone is more or less important according to the intensity or the power of the writing electromagnetic radiation applied to said zone. According to this degree of disorder in a given zone, the intensity of the second harmonic signal as an answer to the same reading radiation applied to this zone varies. In order to increase the storage performances, it is provided to use each of the unit writing zones to store binary symbols composed of binary link. The length of the binary link depends on the number of levels of intensity of the second harmonic signal which can be detected by the reading system.

Similarly to what has been illustrated hereabove, the intensity of the femtosecond pulsed laser is adjusted as a function of the desired final collective state and thus of the binary symbol to be written. The intensity corresponds to the energy which is effectively applied to the zone considered for disordering the corresponding molecules. Such variable intensity may be obtained by modifying the power of the pulsed laser according to one of the four following powers:

state 1: power=0 mW for the symbol "11"
state 2: power=20 mW for the symbol "10"
state 3: power=50 mW for the symbol "01"
state 4: power=100 mW for the symbol "00"

It should be noted that longer binary symbols may be memorised using a larger number of levels of adjustable power. Instead of modifying the power of the laser beam applied, it is possible to vary the time of exposure of the same beam to modify the state of the zone to anyone of the various states.

In the written zones, the molecules are disorganized (irregular orientations of the molecules) which is all the more important as the energy received on the zone is important. Upon the reading by the same reading electromagnetic radiation, the intensity of the second harmonic signal returned by the written zone is all the more important as the disorganisation of the molecules is low. Then the electronics means compare the intensity detected with threshold intensities defining the responses of the four states of molecules. The electronic means then generate the binary signal corresponding to the detected state.

Figure 14:
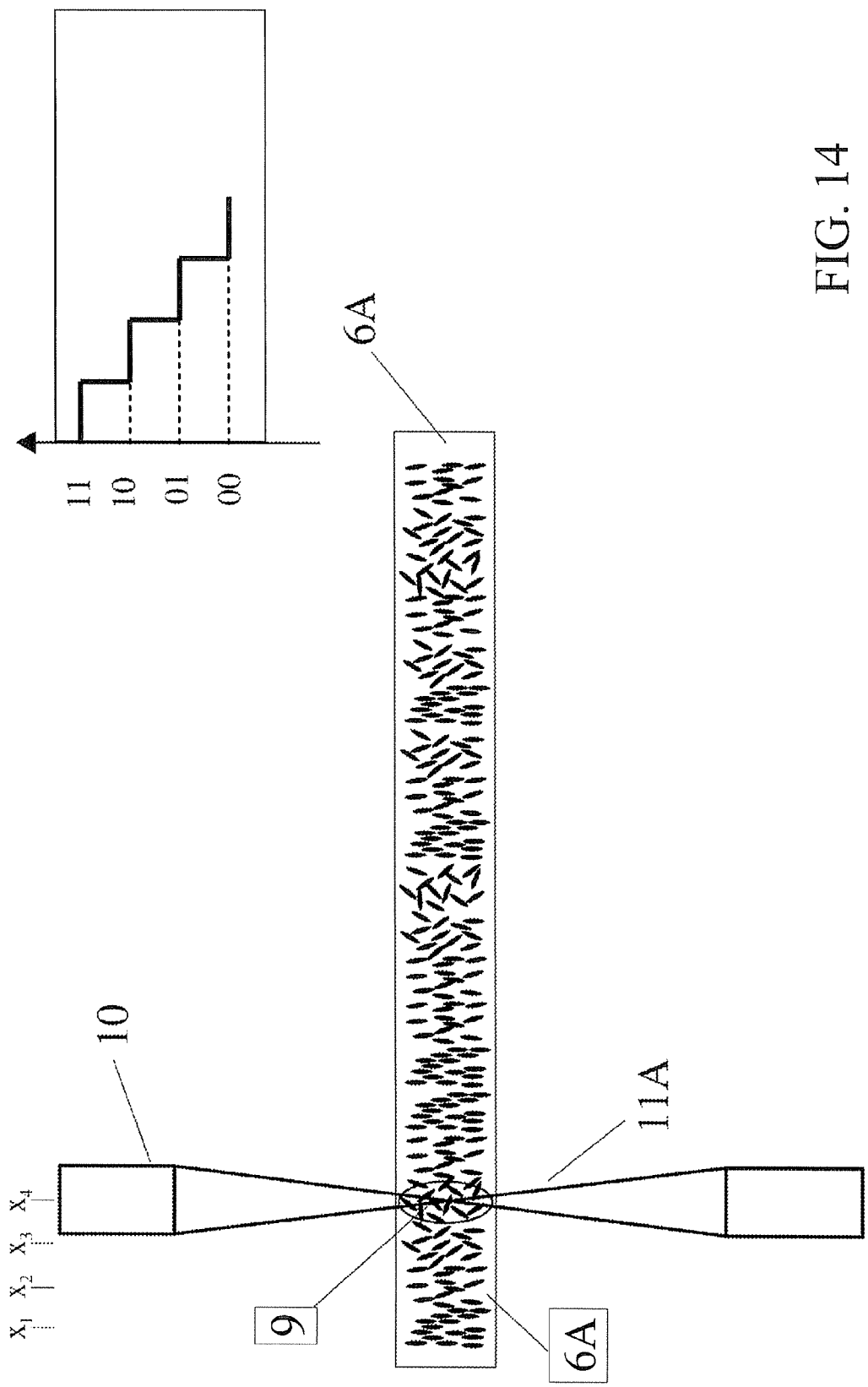
FIG. 14 shows the step of reading a memory using levels of disorder of a writing/reading zone according to the invention.

FIG. 14 illustrates the reading of a memory using levels of disorder of writing/reading zone. The reading laser beam 10 is successively positioned at positions $x_1$, $x_2$, $x_3$, etc. in the memory layer 6A. As previously indicated, the transmitted beam 11A is successively analysed for each one of the positions.

At position $x_1$ a second harmonic signal is detected in the beam 11A because of the privileged orientation of the molecules in the corresponding zone, which correspond to the detection of the binary symbol of the "00" type. At position $x_2$ the molecules of the corresponding focusing zone are slightly disordered. A second harmonic signal (detection thanks to thresholds) is then detected in the transmitted beam 11A which corresponds to a binary signal "10". Similarly, at positions $x_3$ and $x_4$, a strongly attenuated and non existing second harmonic signal are successively detected which correspond respectively to binary symbols "01" and "00".

The invention claimed is:

1. A method for writing into a data memory at least one layer of a supporting material, said layer including molecules being capable of taking a collective state of molecules among at least a first collective state of molecules and a second collective state of molecules, said method comprising:
    applying an orientation electric field to said at least one layer, said orientation electric field being capable of putting said molecules in said first collective state of molecules;
    fixing said molecules in said first collective state of molecules; and
    selective application of a writing electromagnetic radiation to at least one writing zone of said at least one layer, said writing electromagnetic radiation being capable of generating a two photon absorption at said at least one writing zone, said two photon absorption switching said molecules of the first collective state of molecules to said second collective state of molecules in said at least one writing zone;
    with the molecules of two different collective state of molecules being capable of generating, when they are excited by a reading electromagnetic radiation, second-harmonic signals having a different intensity.

2. A method according to claim 1, wherein said molecules are orientable charge-coupled molecules, the various collective states of molecules having various degrees of collective disorientation of the molecules.

3. A method according to claim 2, wherein said first collective state of molecules is a privileged collective orientation of said molecules in said supporting material, and said second state of molecules is a random collective orientation of said molecules, and wherein said orientation electric field is capable of orienting said privileged orientation.

4. A method according to claim 1, wherein only molecules having said first collective state of molecules in said writing zone are capable of generating a second harmonic signal when they are excited by a reading electromagnetic radiation.

5. A method according to claim 1, wherein said step of fixing said molecules in said first collective state of molecules includes a step of polymerisation of said supporting material.

6. A method according to claim 1, wherein said step of selective application of a writing electromagnetic radiation includes:
    receiving a binary writing signal; and
    applying said writing electromagnetic radiation to at least one writing zone as a function of said binary writing signal.

7. A method according to claim 6, comprising:
    receiving a binary writing signal having a value among several values of writing signal;
    adjusting parameters of said electromagnetic radiation so as to define the energy to be applied as a function of said value; and
    applying said electromagnetic rotation at said writing zone.

8. A method according to claim 6, comprising:
    receiving a binary writing signal having a first writing signal value or a second writing signal value; and
    applying said electromagnetic radiation only when said writing signal has said first a writing signal value.

9. A method according to claim 1, further comprising a previous step comprising:
heating said memory so as to place said molecules into said second state of molecules.

10. A method for operating an optical data memory comprising the writing into said optical memory according to claim 1 and at least one subsequent step of reading said optical memory, said reading step including:
focusing a reading electromagnetic radiation on a reading area layer of said optical memory;
detecting the intensity of a second harmonic signal emitted by molecules in said reading zone; and
generating a reading signal representing said detected intensity.

11. A method according to claim 10, wherein said step of generating a reading signal representing said detecting intensity comprises sub-steps including:
generating a first value of said reading signal in case of a positive detection of said second harmonic signal; and
generating a second value of said reading signal in case of said negative detection of said second harmonic signal.

12. A device for writing in a data memory from at least one layer of a supporting material, said supporting material comprising molecules capable of taking a collective state of molecules, at least a first collective state of molecules, and a second collective state of molecules, said device comprising:
orientation means capable of applying an orientation electric field to said at least one layer, so as to place said molecules in said first collective state of molecules;
fixing means capable of fixing said molecules in said collective state of molecules; and
writing means capable of applying selectively a writing electromagnetic radiation to at least one writing zone of said at least one layer, said writing electromagnetic radiation is capable of generating a two photon absorption at said at least one writing area, said two photon absorption switching said molecules from said first collective state of molecules to said second collective state of molecules in said one writing zone;
the molecules of two different collective states of molecules being capable of generating, when they are excited by a reading electromagnetic radiation, second harmonic signals having a different intensity.

13. A device according to claim 12, wherein said molecules are orientable charge-coupled molecules, with the various collective states of molecules having a different degree of collective disorientation of molecules.

14. A device according to claim 13, wherein said first characteristic state of molecules is a privileged collective orientation of said molecules in said supporting material and said second collective state of molecules is a random collective orientation of said molecules in said writing zone and wherein said orientation electric field is capable of orienting said molecules according to said privileged collective orientation.

15. A device according to claim 12, wherein only molecules having said first collective state of molecules being capable of generating a second harmonic signal when they are excited by a reading electromagnetic radiation in said writing zone.

16. A device according to claim 12, further comprising means for setting said writing electromagnetic radiation so as to define some energy to be applied as a function of the final collective state of the zone to be written.

17. A device according to claim 12, wherein said fixation means include polymerisation means capable of polymerising said supporting material.

18. A system for reading/writing from/in an optical data memory comprising a writing device according to claim 12 and a device for reading from said data memory, said reading device comprising:
focusing means capable of focusing a reading electromagnetic radiation on a reading zone of a layer of said optical memory;
detection means capable of detecting the intensity of a second harmonic signal emitted by molecules in said reading zone; and
generating means capable of generating a reading signal representing said detected intensity.

* * * * *